United States Patent
Brunner

[11] Patent Number: 6,115,405
[45] Date of Patent: Sep. 5, 2000

[54] METHOD AND AN ARRANGEMENT FOR DETERMINING THE HEIGHT POSITION OF AN ELECTRODE

[75] Inventor: Mikael Brunner, Täby, Sweden

[73] Assignee: AGA AB, Lindingo, Sweden

[21] Appl. No.: 08/945,301

[22] PCT Filed: Apr. 18, 1996

[86] PCT No.: PCT/SE96/00513

§ 371 Date: Feb. 10, 1998

§ 102(e) Date: Feb. 10, 1998

[87] PCT Pub. No.: WO96/33389

PCT Pub. Date: Oct. 24, 1996

[30] Foreign Application Priority Data

Apr. 18, 1995 [SE] Sweden .................................. 9501406

[51] Int. Cl.[7] .................................................. H05B 7/148
[52] U.S. Cl. ............................................. 373/105; 373/70
[58] Field of Search ..................... 373/105, 102, 373/104, 70, 49

[56] References Cited

U.S. PATENT DOCUMENTS

| | | | |
|---|---|---|---|
| 3,179,734 | 4/1965 | Redel et al. | 373/70 |
| 3,272,905 | 9/1966 | Wooding | 373/70 |
| 3,622,678 | 11/1971 | Allen | 373/49 |
| 3,872,231 | 3/1975 | Motter et al. | 373/105 |
| 3,937,869 | 2/1976 | Markarian et al. | 373/105 |
| 4,296,269 | 10/1981 | Stewart et al. | 373/104 |
| 5,539,768 | 7/1996 | Kracich | 373/105 |

FOREIGN PATENT DOCUMENTS

| | | |
|---|---|---|
| B-87724/82 | 3/1983 | Australia . |
| 2001476 | 1/1971 | Germany . |
| 2651544 | 10/1981 | Germany . |

*Primary Examiner*—Tu Ba Hoang
*Assistant Examiner*—Quang Van
*Attorney, Agent, or Firm*—Pearne, Gordon, McCoy & Granger LLP

[57] ABSTRACT

An arrangement and method for determining the height position of a vertically movable electrode (2) in an arc furnace (1). The arrangement includes an elongated, flexible element (9), preferably a heavy chain, whose one end is attached to a first attachment point on the movable electrode (2). The other end of the chain is attached to a fixed second attachment point. The total weight of those flexible element parts that are carried by the movable and the fixed attachment points respectively will vary in response to vertical movement of the electrode. The arrangement also includes load cell for sensing the part of the total weight supported by the fixed attachment point, for determining the height position of the electrode (2).

11 Claims, 1 Drawing Sheet

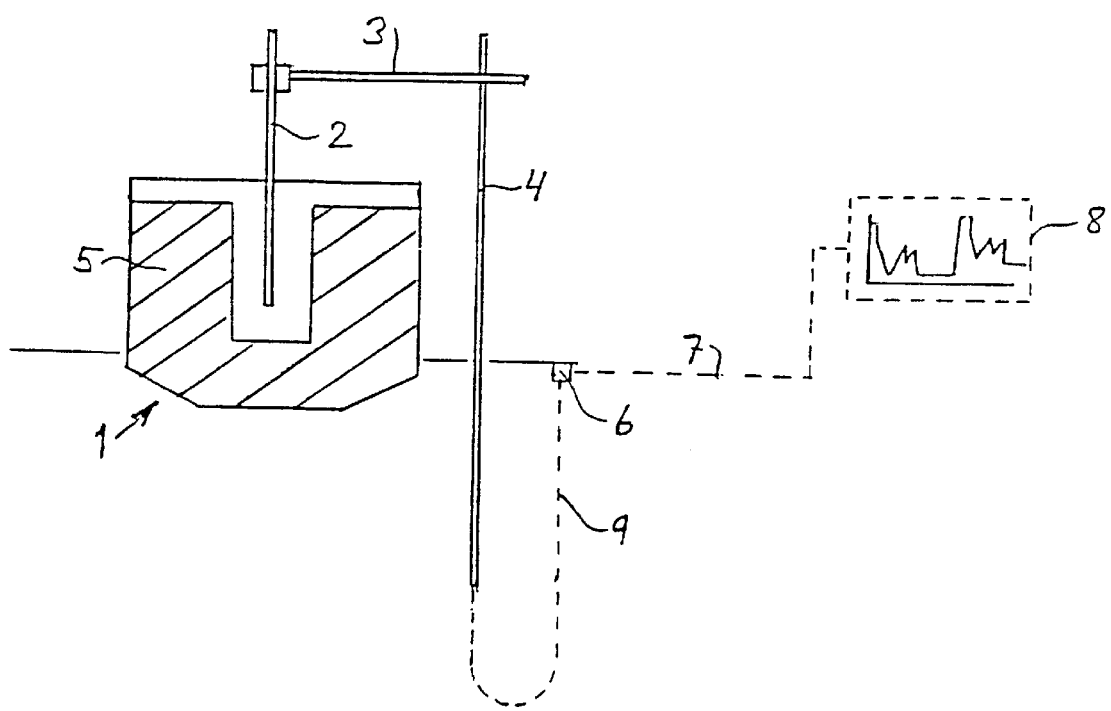

METHOD AND AN ARRANGEMENT FOR DETERMINING THE HEIGHT POSITION OF AN ELECTRODE

BACKGROUND OF THE INVENTION

The present invention relates to a method of determining the height position of an electrode which moves vertically in an arc furnace, using to this end an elongated flexible device, preferably a heavy chain. The invention also relates to an arrangement for carrying out the method.

Arc furnaces normally include one or three electrodes. Three electrodes are used in three-phase furnaces with one electrode connected to each phase, whereas only one electrode is used in direct current furnaces. The electrodes are provided with control means which regulate the height of the electrodes so as to maintain an optimal arc between electrode and scrap or between electrode and the molten bath when the scrap reaches this state. A normal working cycle can thus be divided into three phases.

In the first phase, the furnace is filled with scrap and the electrodes "burrow" down through the scrap charge while melting the scrap. In the second phase, the scrap surrounding the electrode collapses into the "burrow" and the electrodes must again be lifted out of contact with the scrap in order to maintain the arcs. The third phase involves stabilizing the electrodes on a lower level above the molten bath in the furnace. The electrodes are constantly moved up and down to maintain the arcs, particularly during the first two phases.

The optimal process control of arc furnaces requires knowledge of the furnace wall temperature and also of the vertical movement of the electrodes therein. A good estimation of the melting process for optimal control thereof can be obtained by studying the temperature course together with movements of the electrode. This enables productivity to be increased and the consumption of energy to be reduced at the same time. Oxygen consumption can also be optimized thereby.

Continuous sensing and recording of the temperature of the furnace wall elements presents no technical problem. On the other hand, difficulties have been encountered in practice in providing a simple, inexpensive and reliable method for sensing and indicating the height positions of the electrodes as a function of time.

The electrodes are mounted on electrode arms to which so-called electrode masts are connected. Attempts have earlier been made to record the movements of the electrode masts with the aid of lines and associated pulleys and drums for driving angle indicators or like devices; see for instance DE-A-2001476 and DE-C2-2651544 in this regard. The environment that surrounds furnaces of this kind is, however, extremely harsh and problematic and consequently all movable elements will cease to function in the passage of time, and the lines used will often break. Unduly thick lines cannot be used, since they would require the use of pulleys and drums of larger diameters.

The use of optical measuring devices has also been proposed. Such devices, however, increase costs and cause problems as a result coatings that form on the optical elements in the passage of time.

The main object of the present invention is to provide a method and an arrangement which will enable the height position of an electrode in an arc furnace to be determined cheaply, reliably and continuously without the use of rotating elements or optical elements. AU-B-87724/82 describes an arrangement for determining the height position of an elevator or hoist cage. This arrangement includes an elongated flexible element which hangs down from the movable elevator cage and the position of said cage is determined at different points in time, by weighing that part of the flexible element that is carried by the cage.

An arrangement of this kind cannot be used in arc furnaces, because, among other things, the weight sensing load cell would be located close to the furnace in an environment which would cause the function of the cell to become highly unreliable. Furthermore, it would be necessary to install electronic cables up to the furnace, which would result in a number of serious difficulties and increase costs.

Furthermore, the known solution, especially when the flexible element has the form of a heavy chain, would cause the load cell to be subjected to dynamic stresses in conjunction with the rapid accelerations of the electrode that the electronic control arrangement can command, especially when the load cell functions to sense the load continuously. In addition to generating mechanical stresses and strains in the load cell, this would also result in erroneous cell signals because the desired electrode position signals would be obscured by signals resulting from these dynamic forces.

SUMMARY OF THE INVENTION

According to the present invention, a method of the kind defined in the first paragraph for determining the height position of an electrode which can move vertically in an arc furnace is characterized in that one end of the flexible element is attached to a first attachment point on the movable electrode or on a part which moves together therewith whereas the other end of said element is attached to a fixed second attachment point such that the total weight of said parts of the flexible element carried by the movable and the fixed attachment points will vary in dependence on vertical movements of the electrode, wherein the height position of the electrode is determined by sensing that part of the total weight which is carried by the fixed attachment point.

This method thus enables the height position of an electrode to be determined in a very simple manner without the use of rotating elements and without the influence of dynamic forces resulting from acceleration of electrode movement. Furthermore, a weight determining load cell can be placed in a fully protective place, suitably beneath the floor. No problems with regard to the installation of cables, etc., occur with this solution.

The aforesaid weight is suitably sensed continuously and is converted to an electric signal which continuously indicates movement of the electrode. This can be effected with the aid of a load cell mounted at the attachment point.

Other characteristic features of the method and of an arrangement for carrying out the method are made apparent in the following claims.

BRIEF DESCRIPTION OF THE DRAWING

The invention will now be described in more detail with reference to an exemplifying embodiment of an inventive arrangement and also with reference to the accompanying drawing, which shows a schematic view of an arc furnace with a movable electrode, and an apparatus for measuring the height of the electrode.

DETAIL DESCRIPTION OF THE PREFERRED EMBODIMENT

In the drawing, the reference numeral 1 designates generally an arc furnace equipped with an electrode 2. The furnaces are normally operated with three-phase alternating current and include three electrodes, each being separately controlled. Only one electrode has been shown in the schematic drawing, for the sake of simplicity. The electrode 2 is mounted on an electrode arm 3 connected to a movable electrode mast 4. In practice, the height position of the electrode 2 is normally determined by determining the position of the mast 4, since the mast participates in the vertical movement of the electrode.

The furnace 1 is initially filled with scrap 5, which is melted with the aid of arcs generated between the electrodes 2 and the scrap. The FIGURE shows the electrode 2 in the first phase, in which the electrode burrows down into the scrap while melting said scrap and forming a hole therein. Movement of the electrode is controlled with the aid of a control means which senses the electrode supply current so as to maintain an arc between electrode and scrap 5. The electrode 2 is moved constantly up and down in a vertical direction, even though its chief direction of movement is downwards.

The scrap surrounding the electrode generated hole will normally collapse at a certain time point. This collapse is liable to short-circuit the electrode and therewith extinguish the arcs and consequently the electrode is rapidly raised so as to commence a second phase in which the electrode is again moved downwards while melting the material that has collapsed into the hole. Subsequent to the completion of this stage, a stabilizing third phase is commenced, in which the electrode moves over the molten bath in the furnace to a relatively small extent.

As mentioned in the introduction, a clear understanding of the melting process can be obtained by studying the course of electrode movement together with the temperature course in the furnace wall elements, so that the melting process can be optimally controlled and a decision made as to when further scrap shall be charged to the furnace, for instance.

According to the present invention, a heavy chain 9 or the like is, to this end, attached between the bottom end of the movable electrode mast 4 and a fixedly mounted load cell 6. The load cell is conveniently mounted beneath floor level, so as to be protected against both heat and dust and also against scrap falling down in the furnace as the furnace is filled. The load cell is connected to a unit 8 for displaying and recording the obtained signal via a conductor or cable 7.

The load cell 6 delivers a signal which corresponds to the force exerted by the chain 9 on the cell. This force varies between a maximum value when the electrode 2 and the electrode mast 4 are located in their lowermost positions, and a smallest value when said electrode and electrode mast are located in their uppermost positions. Thus, in a particular case, this force exerted by the chain in the first position corresponds to the weight of the entire chain 9, whereas the force exerted in the second position corresponds to half the weight of the chain. The load cell 6 continuously converts this force into an electric signal, which is sent to the unit 8 through the conductor 7. The unit 8 displays electrode movement as a function of time and the curve thus produced is studied together with the course taken by the temperature in the furnace wall elements, to control the melting process. In order to obtain correct measurement values in a continuous sensing process, it is important that the load cell is suspended from the fixed attachment point and not from the movable attachment point, since in this latter case the load cell would be influenced by dynamic forces caused by acceleratory movements of the electrode and therewith deliver false signals.

The aforedescribed arrangement can be installed at low cost and has a very reliable function, among other things because it contains no rotary elements. Furthermore, it can be placed in a well-protected position.

It will be understood that the aforedescribed and illustrated arrangement constitutes solely a preferred embodiment of the invention which can be modified in several respects within the scope of the following claims. For instance, the chain may hang from the attachment point against a collecting means, e.g. in the form of a fixed surface on which a part of the chain is collected and which therewith corresponds to the aforesaid fixed attachment point. The length of chain collected on the collecting surface will be dependent on the position of the electrode and its vertical movement, therewith enabling electrode movements to be determined by the weight of this collected chain length.

The chain may be replaced with some other heavy flexible element and the load cell may be replaced with other means capable of determining the pulling force acting on the fixed attachment point of the chain.

I claim:

1. A method of determining the height position of an electrode which moves vertically in an arc furnace, said method comprising the steps of:

providing an elongated, flexible element;

attaching one end of the flexible element to a first attachment point that is movable with the electrode, and attaching the other end of the flexible element to a fixed second attachment point, such that the first and second attachment points support portions of the weight of the flexible element, said portions varying in response to vertical movement of the electrode; and sensing the portion of the weight of the flexible element supported by the second attachment point for determining the height position of the electrode.

2. A method according to claim 1, wherein the step of sensing said portion of the weight is performed continuously; and wherein the method further comprises the step of converting the sensed portion of the weight to an electric signal which continuously indicates movement of the electrode.

3. An arrangement for determining the height position of an electrode (2) which moves vertically in an arc furnace (1), said arrangement comprising:

a first attachment point movable with the electrode;

a fixed second attachment point;

an elongated, flexible element (9) having one end attached to the first attachment point and the other end attached to the second attachment point such that the first and second attachment points support portions of the weight of the flexible element, said portions varying in response to vertical movement of the electrode; and means (6) for sensing the portion of the weight supported by the second attachment point for determining the height position of the electrode (2).

4. An arrangement according to claim 3, wherein said means for sensing includes a load cell (6) which continuously senses said weight and converts the sensed weight to an electric signal which continuously indicates movement of the electrode.

5. An arrangement according to claim 4, wherein the first attachment point is a bottom end of an electrode mast (4) connected to the electrode (2); and wherein the load cell (6) is mounted adjacent to the second attachment point.

6. An arrangement according to claim 1, wherein the flexible element is a heavy chain.

7. An arrangement according to claim 3, wherein the flexible element is a heavy chain.

8. An apparatus for determining the vertical position of an electrode in an arc furnace, said apparatus comprising:

an electrode mast for connection to the electrode, said electrode mast being movable so as to vertically move the electrode in the furnace;

a load cell for securement to a fixed structure;

a flexible element having a first end portion connected to the electrode mast so as to hang therefrom, and a second end portion connected to the load cell, whereby the electrode mast and the load cell each support a portion of the weight of the flexible element, said portions varying in response to vertical movement of the electrode mast and, thus, the electrode; and wherein the load cell measures the portion of the weight of the flexible element supported by the load cell, thereby determining the vertical position of the electrode.

9. The apparatus of claim 8, wherein the flexible element is a heavy chain.

10. The apparatus of claim 8, wherein the second end portion is connected to the load cell so as to hang therefrom.

11. The apparatus of claim 8, wherein the flexible element is disposed between the electrode mast and the load cell such that a bend is formed in the flexible element.

* * * * *